UNITED STATES PATENT OFFICE.

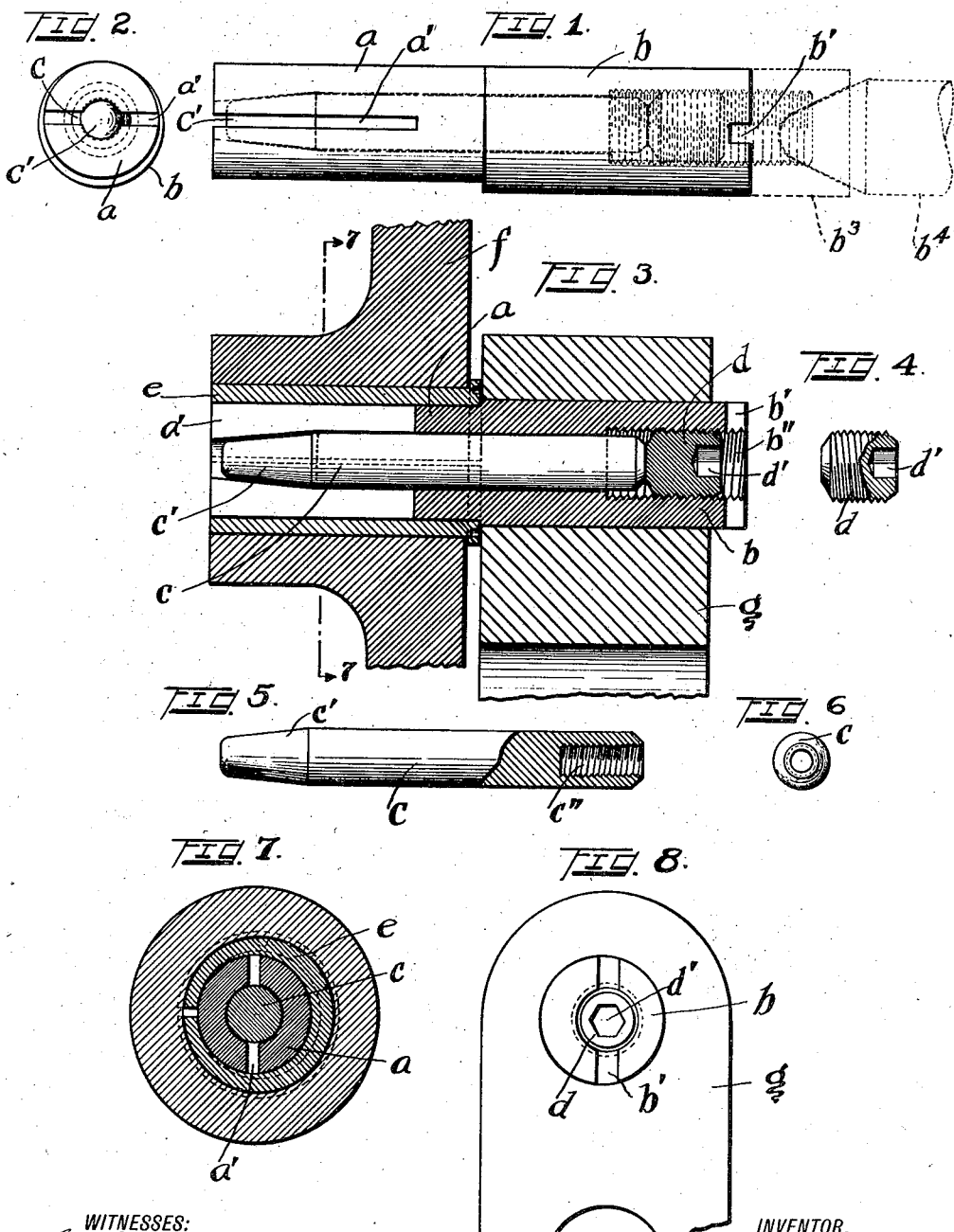

WALTER G. TRAUTMAN, OF CLEVELAND, OHIO, ASSIGNOR TO THE CLEVELAND FOLDING MACHINE COMPANY, OF CLEVELAND, OHIO, A CORPORATION OF OHIO.

ADJUSTABLE MACHINE-BEARING.

1,242,744. Specification of Letters Patent. Patented Oct. 9, 1917.

Application filed May 1, 1916. Serial No. 94,683.

*To all whom it may concern:*

Be it known that I, WALTER G. TRAUTMAN, a subject of the Emperor of Germany, residing at Cleveland, in the county of Cuyahoga and State of Ohio, have invented certain new and useful Improvements in Adjustable Machine-Bearings, of which the following is a specification.

My invention relates to improvements in adjustable machine bearings, and has for its object, the provision of a structure permitting the close adjustment of a bearing member in machine structures, and for firmly and rigidly securing the bearing in all positions of adjustment, while permitting its ready release and readjustment, as desired.

The device of my invention is embodied in a simple eccentric member, having an expansive shank and suitable wedging means in said shank for securing it in position. Associated therewith, I ordinarily employ a split sleeve eccentrically bored, which is adapted either to augment or compensate, in any plane, the eccentric adjustment of said body. These parts are adapted to be mounted in a machine frame, suitably bored out to secure a close fit, and the several elements are so constructed, that a screw device will retain the wedging means fixedly in place, while permitting the removal thereof, whenever desired. The bearing may be mounted upon the exterior eccentric member in any known manner, as by the cone or stud bearings respectively suggested in the drawings, to which I may now make reference stating further details of construction and use.

Figure 1 is a view of the eccentric expansion device in side elevation, with a cone bearing indicated at the right in dotted lines.

Fig. 2 is a rear end view of the device.

Fig. 3 is a vertical section through the device, a fragment of the machine frame and pivoted bearing part mounted thereon.

Fig. 4 shows the retaining screw partially broken away.

Fig. 5 is a side view, partially broken away, showing the wedging pin.

Fig. 6 is a forward end view thereof.

Fig. 7 is a transverse section on line 7—7 of Fig. 3, and

Fig. 8 is an end view of the pivoted bearing, and the bearing link mounted thereon.

Throughout the several figures of the drawings, I have employed the same character of reference to indicate similar parts.

The shank $a$, of the adjustable device, is split at $a'$, through the greater portion of its length, and forwardly mounts an eccentric body-portion $b$, integral therewith. These parts are bored to receive an expanding pin $c$, which is slightly frusto-conical, $c'$, at its extremity, to correspond with the taper bore at the rear of the shank $a$. Said pin is provided with an interior screw thread $c''$, whereby a suitable screw-threaded member may be inserted to withdraw the pin from its expanding position, if required. The forward portion of the body $b$, is slotted at $b'$, and provided with an interior screw thread $b''$, for accommodating the flush screw $d$. This screw is provided with a hexagonal recess $d'$, for receiving a pin of similar cross-section, in order to insert and remove the screw. A split sleeve $e$, forming an eccentric bearing, adapted closely to fit about the shank $a$, is in turn inserted within the bored frame $f$, of the machine, thus equipped with the adjustable bearings.

As shown in Fig. 3, the device is employed as a stud bearing for securing the eccentric adjustment of pivoting link $g$. This link is adapted to swing or turn upon the body-portion $b$, but its axis of rotation is capable of adjustment, merely by rotating the eccentric body $b$, as by a screw-driver inserted within the outer slot, and the sleeve $e$, by means of a suitable spanner.

In Fig. 1, the provision of a cone bearing has been indicated by the dotted lines, comprising an extension $b^3$, of the body-portion, suitably recessed to receive the conical end of the shaft $b^4$, eccentrically mounted for rotation therein.

From a consideration of the several parts above described, it will be understood that the shank and its sleeve may be inserted within the closely fitting opening in the frame $f$, and the eccentricity of the body, with respect thereto, permits it to be adjusted in any rotatable position. The sleeve $e$, in turn, may be rotated either to compensate or augment the eccentricity of the body, so that within the limits of these two eccentric adjustments, the bearing stud or body $b$, may be disposed in any desired position, with respect to the axis of the shank. This having been accomplished, a set may be employed for driving the pin $c$, firmly into its wedging position, whereupon the screw $d$, is set down snugly against the head of the pin. As the parts are made accurately to fit each other, a very slight longitudinal movement of the pin causes the expansion of the split portion of the body of the shank a, and the split sleeve e, so that the device is immovably secured with respect to the frame.

Whenever a re-adjustment of the bearing is desired, the screw d will first be removed, and by the use of a set, a sharp blow struck thereon, when the said set is engaged with the inner end of the wedging pin, will serve to release said pin from its expanding position, and permit the rotation or withdrawal of the several parts of my improved device. In some situations, however, it is difficult to obtain access to the inner end of the pin, and in consequence, a suitable screw-threaded rod may be inserted within the tapped portion $c''$, of the wedging pin, whereby said pin may be withdrawn from its expanding position within the device, upon the removal of the screw d.

The construction of the parts set forth well adapts them to the use herein outlined for adjusting bearings, but obviously the structure is not strictly limited thereto. The wedging pin comprising its cylindrical body and terminally tapered end portion, is well adapted to obtain the slight but powerful expansion, necessary for securing both the body portion and the split eccentric sleeve rigidly within the machine frame. These features also adapt the device for being readily released as explained above, so that with the use of simple tools, such as a screw-driver, a spanner and a set, the expansion device may be readily adjusted as often as may be required, while affording a practically permanent retaining means, so long as the screw is forced down upon the wedging pin, while in its effective position.

Having now explained the preferred construction of my improved device, I claim as new, and desire to secure by Letters Patent, the following:—

1. In a bearing of the class described, the combination with a split-body portion having a rearwardly positioned taper-bore, of an eccentrically positioned bearing support, a tapered pin adapted to be forced within the taper-bore for expanding the same, and separate or independent means for retaining said pin in its expanding position, substantially as set forth.

2. In a bearing of the class described, the combination with a split body-portion having a rearwardly positioned taper-bore, of a split sleeve surrounding said body-portion, a tapered pin adapted to be forced within the taper-bore for expanding the same, and means for retaining said pin in its expanding position, substantially as set forth.

3. In an adjustable bearing, the combination with a cylindrical shank rearwardly split and taper-bored, of a tapered pin adapted to be inserted within said bore, an eccentric member rotatable with said shank, and a screw adapted to be inserted within said member for retaining the pin in its expanding position within the taper-bore, substantially as set forth.

4. In a device of the class described, the combination with a cylindrical shank rearwardly split and taper-bored, of a pin positioned to be forced within the taper-bore, a split eccentrically bored sleeve fitting upon said shank, and means for retaining the pin in its expanding position within the taper bore, whereby the shank and sleeve may simultaneously be expanded, substantially as set forth.

5. In a device of the class described, the combination with a split eccentric sleeve, of a split cylindrical shank fitting slosely within said sleeve, and internal mechanism for forcibly expanding the sleeve and shank, substantially as set forth.

6. In a device of the class described, the combination with a split cylindrical shank having a cylindrical bore terminally tapered, of an elongated expanding pin fitting within said taper-bore, and separate or independent means for retaining said pin in its expanding position within said bore, substantially as set forth.

7. In a device of the class described, the combination with a terminally split shank having a cylindrical bore terminally tapered adjacent to the split portion of the shank, of a substantially cylindrical expanding pin fitting within the bore of the shank and adapted to be driven home within its tapered portion, and a screw insertible within said shank and adapted to hold the pin in position normally, substantially as set forth.

8. In an expansion member, the combination with a shank terminally split at one end, screw threaded at the other and centrally bored with a taper bore coinciding with the split portion, of an elongated and tapered pin fitting within said taper bore, and a screw adapted to be inserted within the threaded portion for holding the pin after it has been seated, substantially as set forth.

In testimony whereof I do now affix my signature in the presence of two witnesses.

WALTER G. TRAUTMAN. [L. S.]

Witnesses:
WM. B. WOODS,
ALBERT LYNN LAWRENCE.